US008245286B2

(12) United States Patent
Nasu et al.

(10) Patent No.: US 8,245,286 B2
(45) Date of Patent: Aug. 14, 2012

(54) INFORMATION PROCESSING DEVICE, ELECTRONIC CERTIFICATE ISSUING METHOD, AND COMPUTER-READABLE STORAGE MEDIUM

(75) Inventors: Masami Nasu, Kanagawa (JP); Jun Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 445 days.

(21) Appl. No.: 12/423,057

(22) Filed: Apr. 14, 2009

(65) Prior Publication Data

US 2009/0265546 A1 Oct. 22, 2009

(30) Foreign Application Priority Data

Apr. 17, 2008 (JP) .................................. 2008-107891

(51) Int. Cl.
*G06F 7/04* (2006.01)
(52) U.S. Cl. .......................................... 726/10; 713/156
(58) Field of Classification Search ..................... 726/10
See application file for complete search history.

(56) References Cited

U.S. PATENT DOCUMENTS

2008/0313264 A1* 12/2008 Pestoni ......................... 709/202

FOREIGN PATENT DOCUMENTS

JP 2004-320715 11/2004

* cited by examiner

*Primary Examiner* — Christopher Brown
(74) *Attorney, Agent, or Firm* — IPUSA, PLLC

(57) ABSTRACT

An information processing device acquires first identification information of a computer to which the device is coupled, and records correspondence information indicating a correspondence between a product key of a predetermined program and the first identification information, and second identification information with respect to the correspondence information, in the device, if a license authentication with respect to the product key based on the first identification information is successful. The device generates an individual certificate package including a unique secret key and public key for each second identification information, and records the individual certificate package in the device in correspondence with each second identification information.

12 Claims, 14 Drawing Sheets

FIG.5

| PRODUCT KEY | HARDWARE INFO | SERIAL NO. | INVALID FLAG |
|---|---|---|---|
| ... | ... | ... | |
| | | | |

51

INFORMATION PROCESSING DEVICE, ELECTRONIC CERTIFICATE ISSUING METHOD, AND COMPUTER-READABLE STORAGE MEDIUM

BACKGROUND OF THE INVENTION

1. Field of the Invention

The present invention generally relates to information processing devices, electronic certificate issuing methods and storage media, and more particularly to an information processing device, an electronic certificate issuing method and a computer-readable storage medium which issue an electronic certificate.

2. Description of the Related Art

Conventionally, there is the so-called "remote monitoring system" which enables a manufacturer or a maintenance service provider to remotely monitor via the Internet an image forming apparatus, such as a copying machine, a printer and a Multi-Function Peripheral (MFP), that is set up in an office, for example. The remote monitoring system includes an equipment information collecting apparatus which is provided on the user end and collects equipment information from the image forming apparatus, and a server apparatus which is provided on the manufacturer end or the maintenance service provider end. The equipment information collecting apparatus transfers the equipment information to the server apparatus via the Internet. Alternatively, the image forming apparatus transfers the equipment information directly to the server apparatus.

The equipment information may be used for accounting, and may include user's personal information or secret information. For this reason, there is a demand to transfer the equipment information by a secure communication. In order to prevent tampering of data or impersonating of the user on the transfer path, the equipment information is transferred between a client apparatus (that is, the equipment information collecting apparatus or the image forming apparatus) and the server apparatus by a communication employing mutual authentication and enciphering in a Secure Socket Layer (SSL).

In order to perform the mutual authentication, the client apparatus and the server apparatus must each have a secret key. The secret key must not be leaked to a third party in order to maintain security of the remote monitoring system. In addition, the secret key must be usable only by those client apparatuses authorized by the manufacturer or the maintenance service provider.

According to the conventional remote monitoring system, the public key certificate and the secret key, which are unique to the client apparatus, are basically embedded into each client apparatus when the client apparatuses are forwarded from the factory. In other words, an embedded equipment (or device) which is embedded with the unique public key certificate and secret key, and not a general purpose computer such as a Personal Computer (PC), is used for the image forming apparatus or the equipment information collecting apparatus forming the client apparatus.

Accordingly, when forwarding the client apparatuses from the factory, it is possible to record the secret key and the like in each client apparatus in a manner such that the secret key and the like cannot be physically extracted. As a result, it is possible to secure the uniqueness and safety of the secret key.

The applicant is aware of a Japanese Laid-Open. Patent Publication No. 2004-320715.

However, the flexibility of the remote monitoring system will be reduced by limiting the client apparatus to the embedded equipment (or device). For this reason, it is desirable to realize the functions of the client apparatus (equipment information collecting apparatus) by software that is installable into a general purpose computer such as the PC.

However, when the software described above is distributed in the form of a package via the Internet or a recording medium such as a CD-ROM, the package is created by copying the software. Hence, it is difficult to safely introduce the secret key and the like that are unique to each package, with respect to the PC to which the software is installed.

On the other hand, when the package is distributed via a network such as the Internet, a third party can acquire the package in a relatively easy manner. Consequently, the server apparatus which uses the software may be subject to an attack from the third party who acquired the package.

SUMMARY OF THE INVENTION

Accordingly, it is a general object of the present invention to provide a novel and useful information processing device, electronic certificate issuing method and computer-readable storage medium, in which the problem described above is suppressed.

Another and more specific object of the present invention is to provide, among other things, an information processing device, an electronic certificate issuing method and a computer-readable storage medium, which can appropriately allocate a unique electronic certificate with respect to a program which is copied and distributed.

According to one aspect of the present invention, there is provided an information processing device comprising a storage device configured to store a predetermined program which causes a computer to communicate using a secret key and a public key; an acquiring unit configured to acquire first identification information of the computer to which the information processing device is coupled; a recording unit configured to record correspondence information indicating a correspondence between a product key of the predetermined program and the first identification information, and second identification information with respect to the correspondence information, in the storage device, if a license authentication with respect to the product key based on the first identification information is successful; and a certificate generating unit configured to generate an individual certificate package including a unique secret key and public key for each second identification information, and to record the individual certificate package in the storage device in correspondence with each second identification information.

According to one aspect of the present invention, there is provided an electronic certificate issuing method executed by an information processing device, comprising an acquiring procedure acquiring first identification information of a computer to which the information processing device is coupled; a recording procedure recording correspondence information indicating a correspondence between a product key of a predetermined program which causes the computer to communicate using a secret key and a public key and the first identification information, and second identification information with respect to the correspondence information, in the information processing device, if a license authentication with respect to the product key based on the first identification information is successful; and a certificate generating procedure generating an individual certificate package including a unique secret key and public key for each second identification information, and recording the individual certificate package in the information processing device in correspondence with each second identification information.

According to one aspect of the present invention, there is provided a computer-readable storage medium which stores a program which, when executed by a computer, causes the computer to perform a process of an information processing device, comprising an acquiring procedure acquiring first identification information of a computer to which the information processing device is coupled; a recording procedure recording correspondence information indicating a correspondence between a product key of a predetermined program which causes the computer to communicate using a secret key and a public key and the first identification information, and second identification information with respect to the correspondence information, in the information processing device, if a license authentication with respect to the product key based on the first identification information is successful; and a certificate generating procedure generating an individual certificate package including a unique secret key and public key for each second identification information, and recording the individual certificate package in the information processing device in correspondence with each second identification information.

According to one aspect of the present invention, it is possible, among other things, to appropriately allocate a unique electronic certificate with respect to a program which is copied and distributed.

Other objects and further features of the present invention will be apparent from the following detailed description when read in conjunction with the accompanying drawings.

BRIEF DESCRIPTION OF THE DRAWINGS

FIG. 5 is a diagram showing an example of a structure of an activation management table;

DESCRIPTION OF THE PREFERRED EMBODIMENTS

Figure 1:
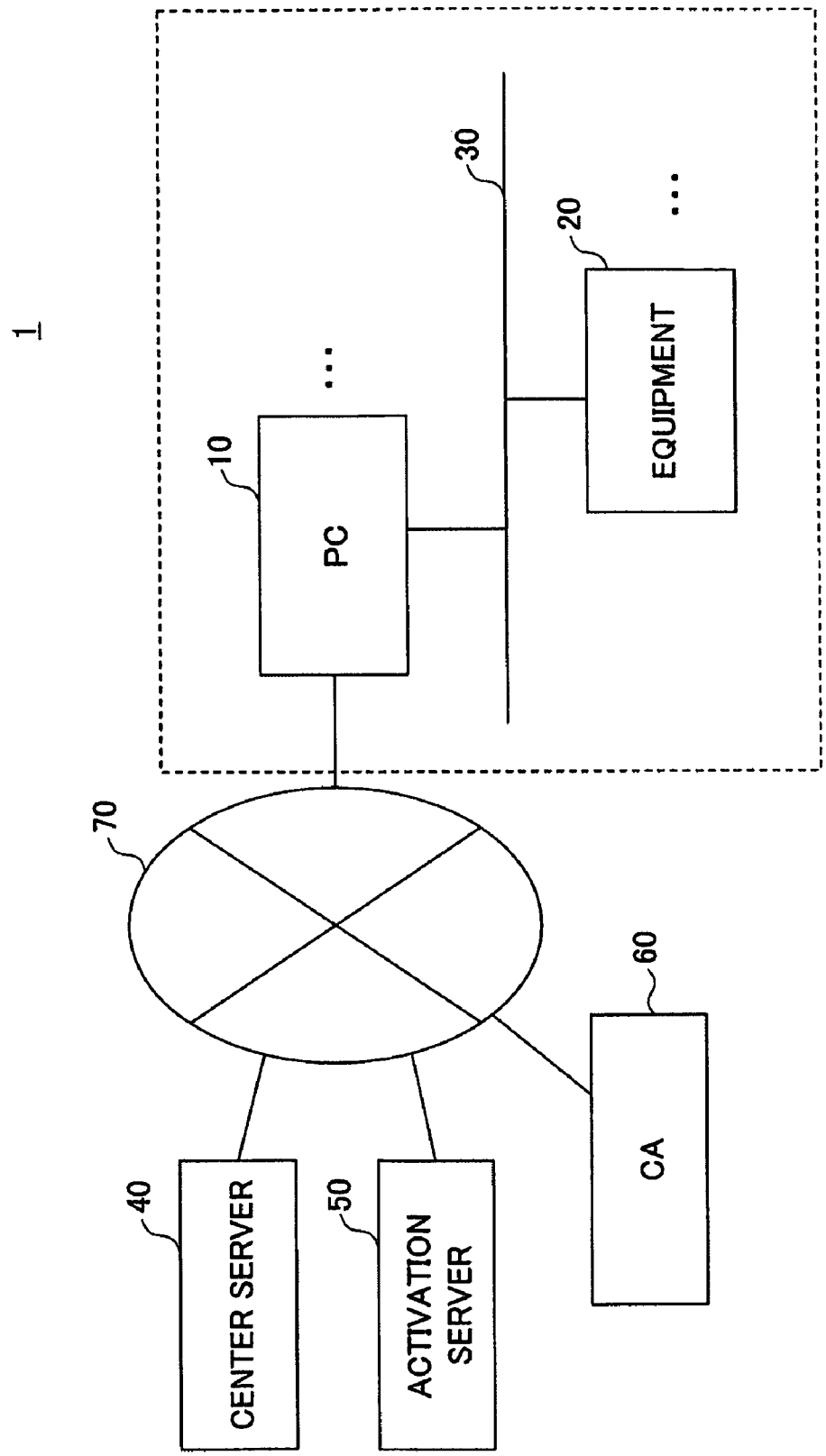
FIG. 1 is a diagram showing an example of an equipment monitoring system in one embodiment of the present invention.

A description will be given of embodiments of the information processing device, the electronic certificate issuing method and the computer-readable storage medium according to the present invention, by referring to the drawings.

FIG. 1 is a diagram showing an example of an equipment monitoring system in one embodiment of the present invention. In FIG. 1, an equipment monitoring system 1 includes one or more PCs 10, one or more equipments 20, a center server 40, an activation server 50, and a Certificate Authority (CA) 60. The PCs 10 and the equipments 20 are connected via a cable or wireless network 30, such as a Local Area Network (LAN). The PCs 10, the center server 40, the activation server 50 and the CA 60 are connected via a network 70, such as the Internet.

Each PC 10 and each equipment 20 are set up at a user site in an office or the like. The user site is where the equipments 20 are set up. The equipment 20 is the monitoring target in the equipment monitoring system 1, and is formed by a copying machine, a printer, a facsimile machine, a Multi-Function Peripheral (MFP) or the like. The PC 10 collects equipment information related to the monitoring target from each equipment 20, and transfers the collected equipment information to the center server 40 by an enciphered (or encrypted) communication via mutual authentication. The equipment information indicates various counter values, operating states and the like. For example, a communication employing the Secure Socket Layer (SSL) is used for the enciphered communication via mutual authentication. Of course, a plurality of user sites may exist. The function of collecting the equipment information and transferring the collected equipment information to the center server 40 is realized by an equipment information notifying program which is executed in the PC 10.

The center server 40 belongs to a monitoring site of the equipments 20, such as a manufacturer of the equipments 20 and the maintenance service provider (or operator). The center server 40 is formed by a computer which provides an equipment monitoring service such as receiving the equipment information from the PC 10 and storing the received equipment information, during a normal operation of the equipment monitoring system 1. The center server 40 intervenes between the PC 10 and the CA 60 during a process which is performed to secure security, such as communicating from the PC 10 to the center server 40, prior to starting the operation of monitoring of the equipments 20. More particularly, the center server 40 requests the CA 60 to issue data (hereinafter referred to as an individual certificate package) including a secret key, a public key certificate and the like which are unique to each PC 10, in response to a request from the PC 10, and returns the individual certificate package issued from the CA 60 to the PC 10 which made the request. The individual certificate package (secret key, public key certificate, etc.) is used for the mutual authentication and enciphered communication between PC 10 and the center server 40 when the PC transfers the equipment information to the center server 40. In this embodiment, the individual certificate package is formed by an electronic certificate package in conformance with the Public Key Cryptography Standards (PKCS).

The activation server 50 performs an activation (or activation process) related to the equipment information notifying program. The "activation" refers to the process of confirming whether a target possesses the legitimate license, that is, the license authentication.

The CA 60 is the so-called authenticator (or authenticating body) which is formed by one or more computers and issues the individual certificate package and the like. In this embodiment, the CA 60 maintains uniqueness of the individual certificate package and prevents issuance of the individual certificate package with respect to the client (PC 10) who does not possess the license, by linking with the activation server 50.

Figure 2:
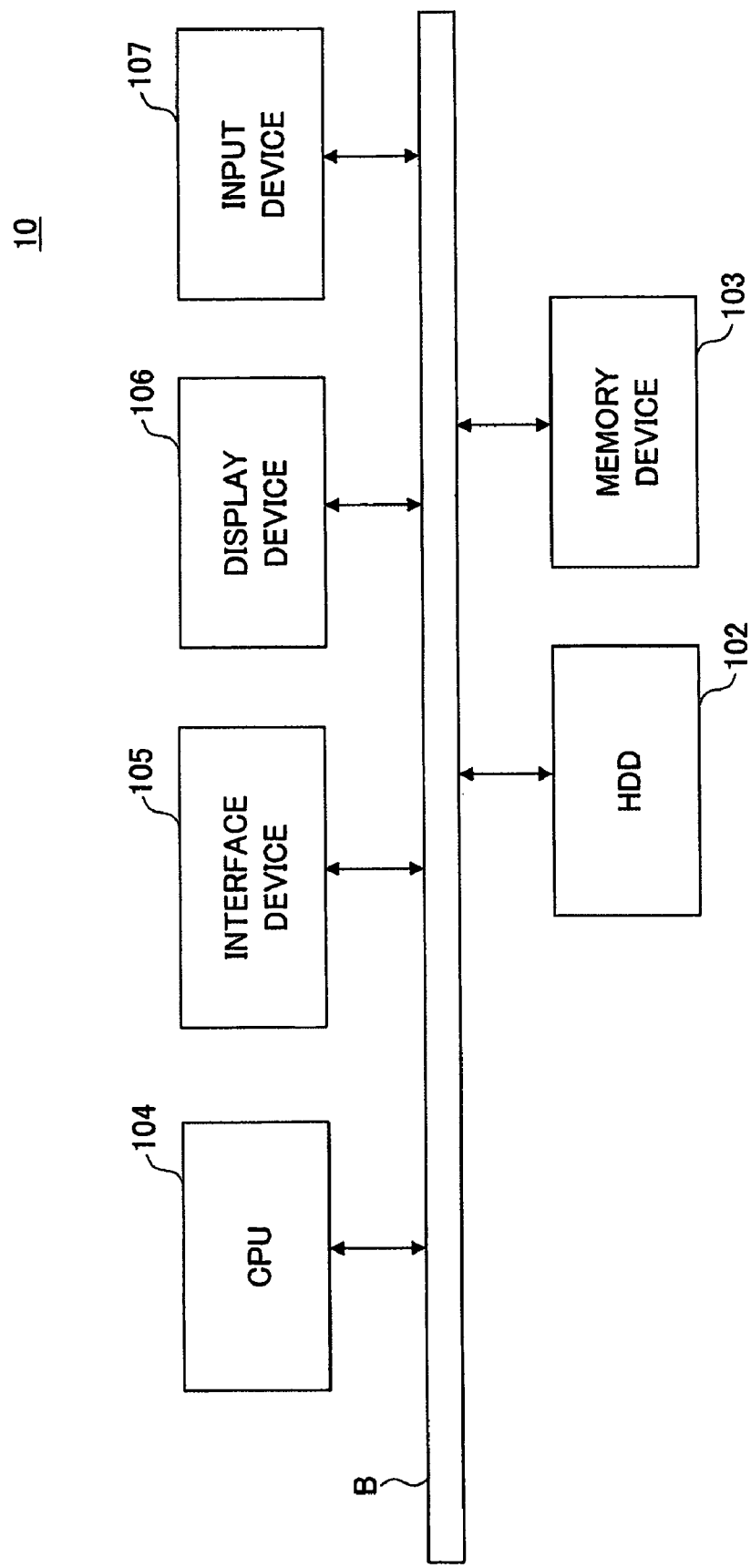
FIG. 2 is a diagram showing a hardware structure of a Personal Computer (PC) in one embodiment of the present invention.

FIG. 2 is a diagram showing a hardware structure of a Personal Computer (PC) in one embodiment of the present invention. The PC 10 shown in FIG. 2 includes a Hard Disk Drive (HDD) 102, a memory device 103, a CPU 104, an interface device 105, a display device 106, and an input device 107 which are connected via a bus B.

The equipment information notifying program which realizes the process of the PC 10 is downloaded via the network 30 or the networks 70 and 30, for example, and is installed in the HDD 102. In addition to the equipment information notifying program installed therein, the HDD 102 also stores necessary files, data and the like.

The memory device 103 stores the equipment information notifying program that is read from the HDD 102 when a start instruction is issued to start the equipment information notifying program. The CPU 104 realizes the functions of the PC 10 according to the equipment information notifying program stored in the memory device 103. The interface device 105 provides an interface for connecting the PC 10 to the network 30. The display device 106 displays a Graphical User Interface (GUI) or the like by the equipment information notifying program. The input device 107 is formed by a keyboard, a mouse and the like, and is used to input various operation instructions.

The installing of the equipment information notifying program does hot necessarily have to be made via the network 30, and may be made via a recording medium such as a CD-ROM and a SD-Card.

Each of the center server 40, the activation server 50 and the CA 60 may have a hardware structure similar to the hardware structure of the PC 10 shown in FIG. 2. However, in the case of the center server 40, the activation server 50 and the CA 60, it is not essential to provide or connect the display device 106 and the input device 107.

Figure 3:
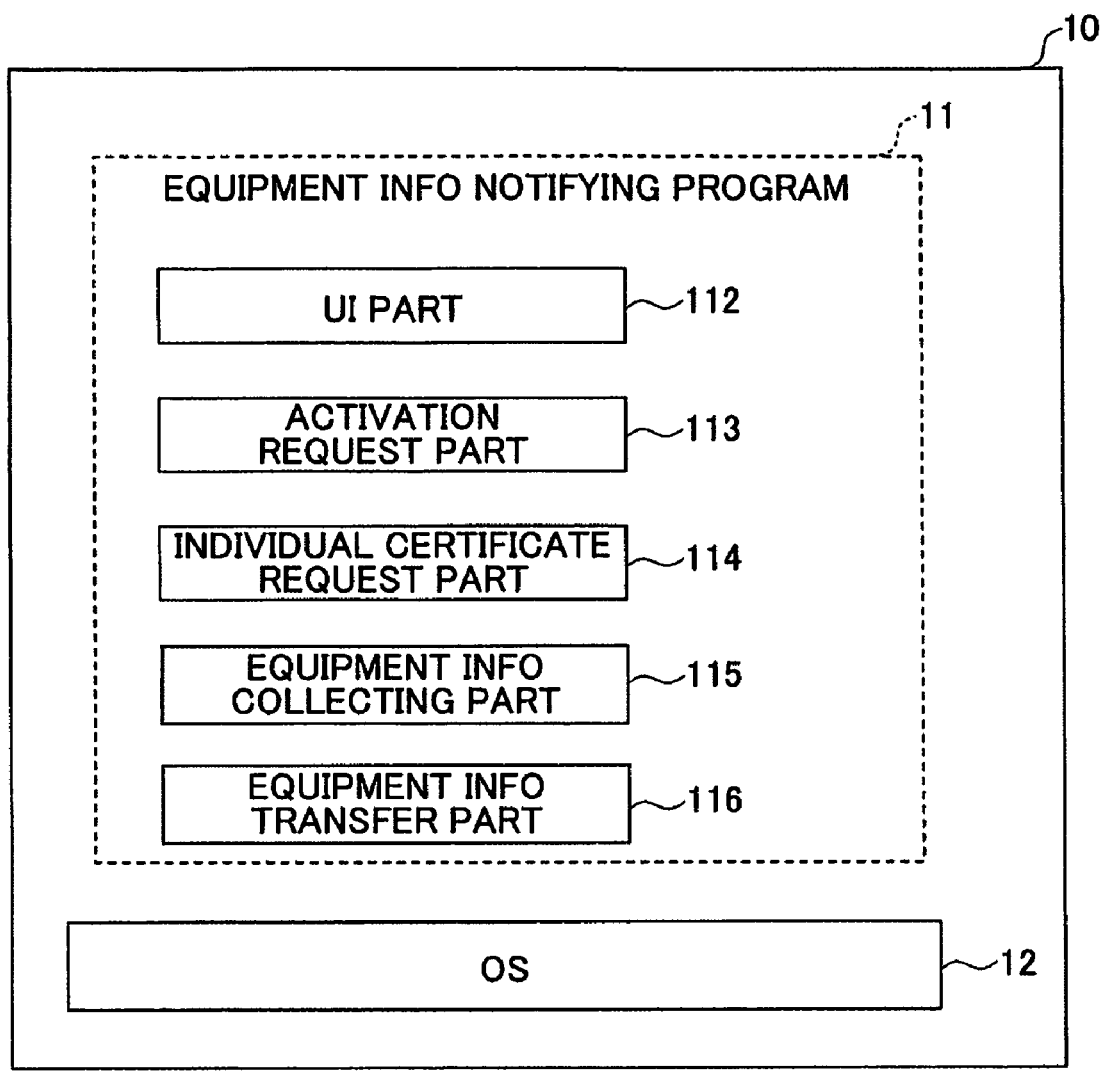
FIG. 3 is a diagram showing an example of a functional structure of the PC in a first embodiment of the present invention.

FIG. 3 is a diagram showing an example of a functional structure of the PC in a first embodiment of the present invention. In FIG. 3, an equipment information notifying program 11 operates (or runs) on an Operating System (OS) 12, and causes the PC 10 to function as a User Interface (UI) part 112, an activation request part 113, an individual certificate request part 114, an equipment information collecting part 115, and an equipment information transfer part 116.

The UI part 112 displays the GUI on the display device 106, and performs processes such as detecting a user request and providing information to the user. The activation request part 113 makes an activation request for the equipment information notification program 11, with respect to the activation server 50. The individual certificate request part 114 requests issuance of the individual certificate package with respect to the center server 40 depending on the activation result. The equipment information collecting part 115 collects the equipment information from the equipments 20 that are connected to the network 30. The equipment information transfer part 116 transfers the collected equipment information to the center server 40. When transferring the collected equipment information, the equipment information transfer part 116 performs the mutual authentication and enciphered communication using the individual certificate package.

Identification information which enables the PC 10 to communicate with the center server 40, the activation server 50 and the CA 60, such as the Internet Protocol (IP) address, a host name, and a Uniform Resource Locator (URL), is stored in the HDD 102 at a location that is recognizable by the equipment information notifying program 11.

Figure 4:
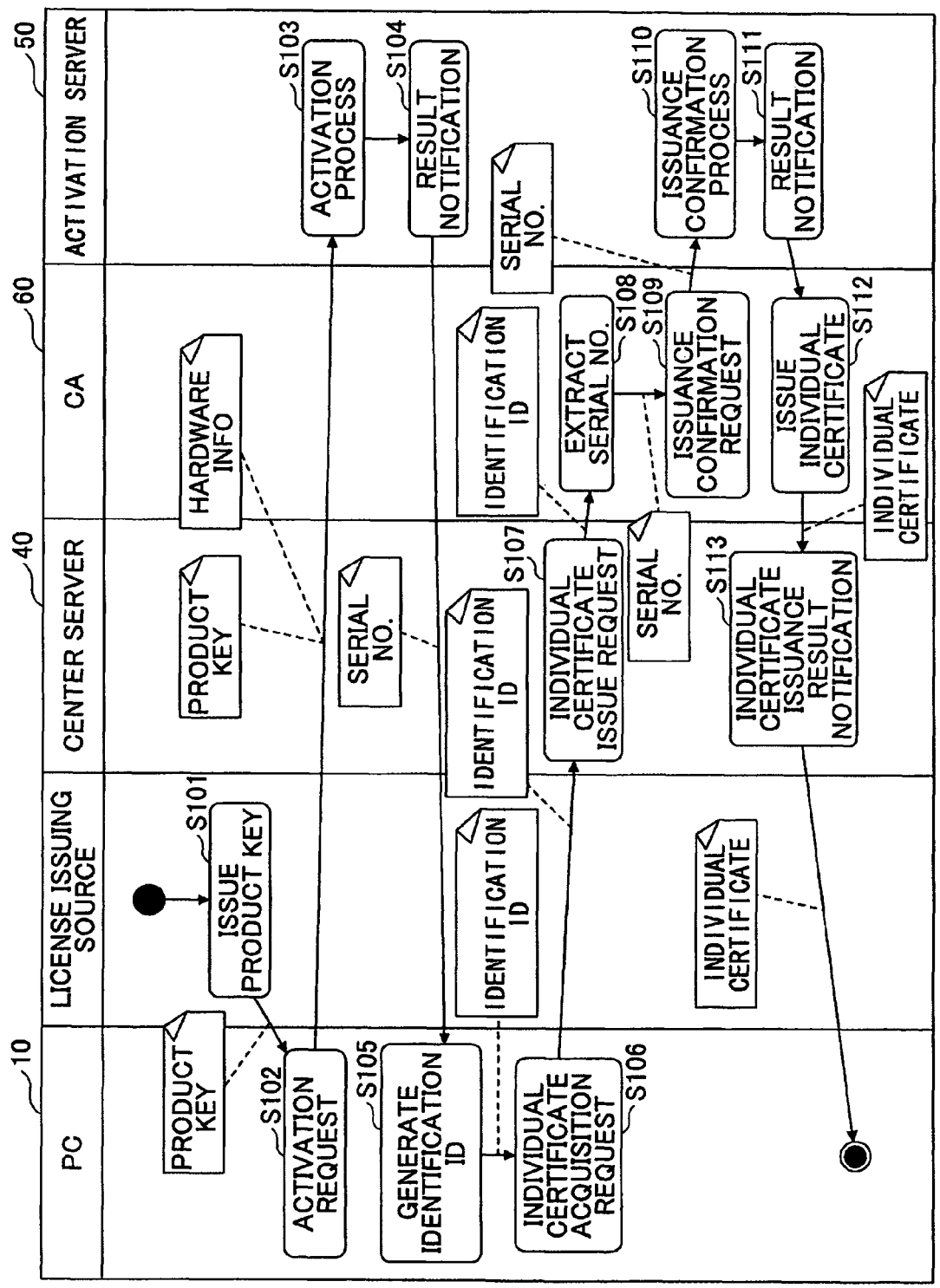
FIG. 4 is a diagram for explaining an individual certificate package issuing process in the first embodiment.

Next, a description will be given of a processing sequence of the equipment monitoring system 1. FIG. 4 is a diagram for explaining an individual certificate package issuing process in the first embodiment. The process in each apparatus of the equipment monitoring system 1 is performed by the control of the program which is installed in each apparatus and executed.

In a step S101 shown in FIG. 4, a license issuing source of the equipment information notifying program 11 issues a product key (or license key) corresponding to the license. A user of the PC 10 (hereinafter simply referred to as a "user") receives the product key issued from the license issuing source. For example, the product key is issued when the license is purchased. The method of purchasing the license and the method of issuing the product key are not limited to particular methods, and the purchasing of the license and the issuing of the product key may be made via the Internet or via a recording medium, including paper. The product key is unique to each license.

Next, when the user inputs the product key from a screen which is displayed by the UI part 112, the activation request part 113 sends an activation request (request to use) for the equipment information notifying program 11 with respect to the activation server 50, in a step S102. The activation request includes the product key and hardware information of the PC 10. The hardware information is any information which physically and uniquely identifies the PC 10, such as a Media Access Control (MAC) address of the PC 10, a serial number of the CPU 104, and a serial number of the memory device 103. The activation request part 113 acquires the hardware information from the PC 10. The UI part 112 stores the input product key at a predetermined location in the HDD 102.

The activation server 50 performs an activation process (or license authentication) based on an activation management table when the product key and the hardware information are received from the PC 10, in a step S103.

FIG. 5 is a diagram showing an example of a structure of the activation management table. An activation management table 51 shown in FIG. 5 manages the serial number and an invalid flag with respect to each pair of activated (license authenticated) product key and hardware information. The activation management table 51 is stored in a storage device of the activation server 50.

Accordingly, the activation server 50 authenticates the license by judging whether or not the received product key is already registered in the activation management table 51 in correspondence with another hardware information (that is, whether or not the equipment information notifying program 11 is being used by another PC 10 based on the same product key information). In a case where the license with respect to the received product key permits simultaneous use of the product key in a plurality of PCs 10, the activation server 50 authenticates the license by judging whether or not different hardware information amounting to the number of licenses (hereinafter referred to as a license number) with respect to the received product key is already registered in the activation management table 51 in correspondence with the received product key. Information specifying the license number may be included in a product identifier (ID) or, may be inquired to the computer at the license issuing source based on the product ID.

If the hardware information amounting to the license number with respect to the received product key is not registered in the activation management table 51 (that is, no activation amounting to the license number has yet been made), the activation server 50 authenticates the license with respect to the received product key and hardware information (that is, judges that the license is legitimate), and registers the received product key and hardware information in the activation management table 51 in correspondence with each other. In addition, the activation server 50 generates a serial number, that is, identification information, which is unique to the pair of received product key and hardware information, and registers the serial number in the activation management table 51 in correspondence with the pair.

Next, the activation server 50 sends (or issues) the serial number with respect to the PC 10, in a step S104. If the license authentication fails (or the activation amounting to the license number has already been made), the activation server 50 sends to the PC 10 information indicating that the activation failed. Hence, the serial number is issued only when the activation is successful.

The individual certificate request part 114 of the PC 10 generates an identification identifier (ID) by performing a reversible conversion (or reversible transformation) with respect to the combination of a model identifier (ID) and a serial number, in a step S105. The model ID is an identifier (ID) assigned to the equipment information notifying program 11. In other words, the model ID takes a common value with respect to all equipment information notifying programs 11 which are distributed. Then, the individual certificate request part 114 requests issuance of the individual certificate package by sending the identification ID to the center server 40, in a step S106.

The center server 40 transfers the received identifier ID and the issuance request for the individual certificate package to the CA 60, in a step S107. The CA 60 extracts the serial number from the received identification ID in a step S108, and sends the serial number to the activation server 50 in order to inquire whether or not the serial number is a legitimately issued serial number, in a step S109. The activation server 50 judges whether or not the serial number is a legitimately issued serial number based on the activation management table 51, in a step S110. If the serial number is registered in the activation management table 51, the activation server 50 judges that the serial number is a legitimately issued serial number. On the other hand, the activation server 50 judges that the serial number is not a legitimately issued serial number if the serial number is not registered in the activation management table 51. The activation server 50 returns a judgement result to the CA 60, in a step S111.

If the serial number is a legitimately issued serial number, the CA 60 generates a unique individual certificate package with respect to the identification ID, that is, with respect to the equipment information notifying program 11 of the PC 10, and returns the generated individual certificate package to the center server 40, in a step S112.

Figure 6:
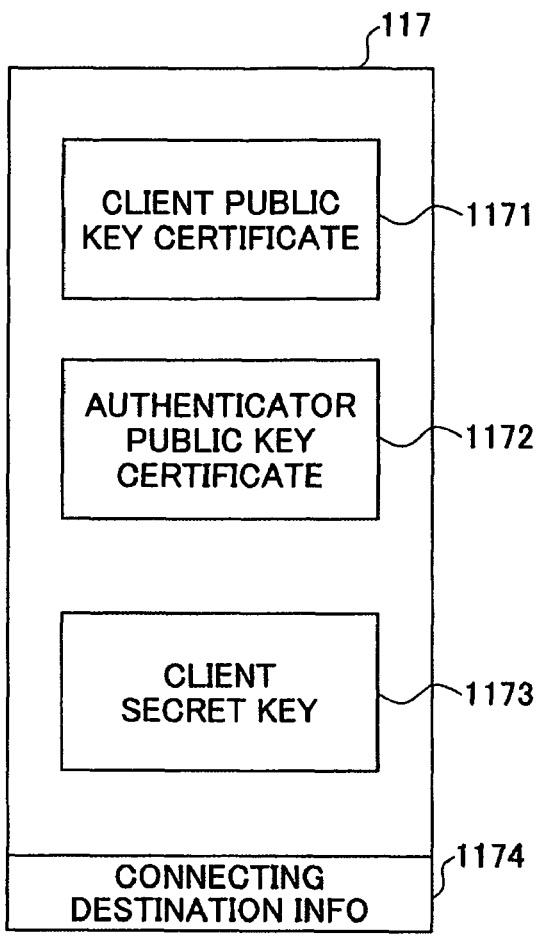
FIG. 6 is a diagram showing an example of a structure of an individual certificate package.

FIG. 6 is a diagram showing an example of a structure of the individual certificate package. As shown in FIG. 6, an individual certificate package 117 includes a client public key certificate 1171, an authenticator public key certificate 1172, a client secret key 1173, and a connecting destination information 1174. The client public key certificate 1171 and the client secret key 1173 are respectively used as a public key certificate and a secret key at the PC 10 when performing the mutual authentication and enciphered communication between the PC 10 and the center server 40. The authenticator public key certificate 1172 is a public key certificate of the CA 60. The connecting destination information 1174 is identification information of the connecting destination for the enciphered communication using the individual certificate package 117, and is formed by an IP address of the center server 40 in this embodiment.

In addition, the CA 60 registers the identification ID, which is an issuance target of the individual certificate package 117, in a certificate issuance log list.

Figure 7:
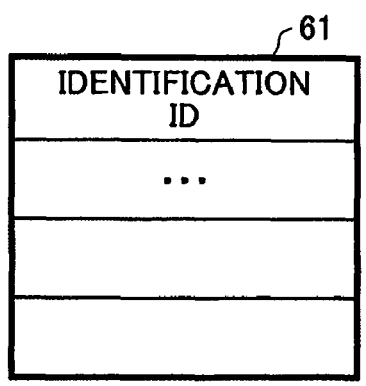
FIG. 7 is a diagram showing an example of a structure of a certificate issuance log list.

FIG. 7 is a diagram showing an example of a structure of the certificate issuance log list. As shown in FIG. 7, a certificate issuance log list 61 is a list of identification IDs issued by the individual certificate package 117. For example, the certificate issuance log list 61 is stored in a storage device of the CA 60.

Next, when the center server 40 receives the individual certificate package 117, the center server 40 transfers the individual certificate package 117 to the PC 10, in a step S113. The individual certificate request part 114 of the PC 10 stores the received individual certificate package 117 in the HDD 102 at a predetermined location.

When the equipment information notifying program 11 is activated in the PC 10 and the individual certificate package 117 is introduced with respect to the PC 10, it becomes possible for the equipment information transfer part 116 to transfer the equipment information collected by the equipment information collecting part 115 with respect to the center server 40. When transferring the equipment information, the equipment information transfer part 116 sends the product key and the hardware information stored in the HDD 102 to the activation server 50 in order to inquire whether or not the execution of the equipment information transfer is permitted. The activation server 50 permits the execution if the received product key and hardware information are registered in the activation management table 51.

If the execution of the equipment information transfer is permitted, the equipment information transfer part 116 executes a mutual authentication by the SSL using the individual certificate package 117.

Figure 8:
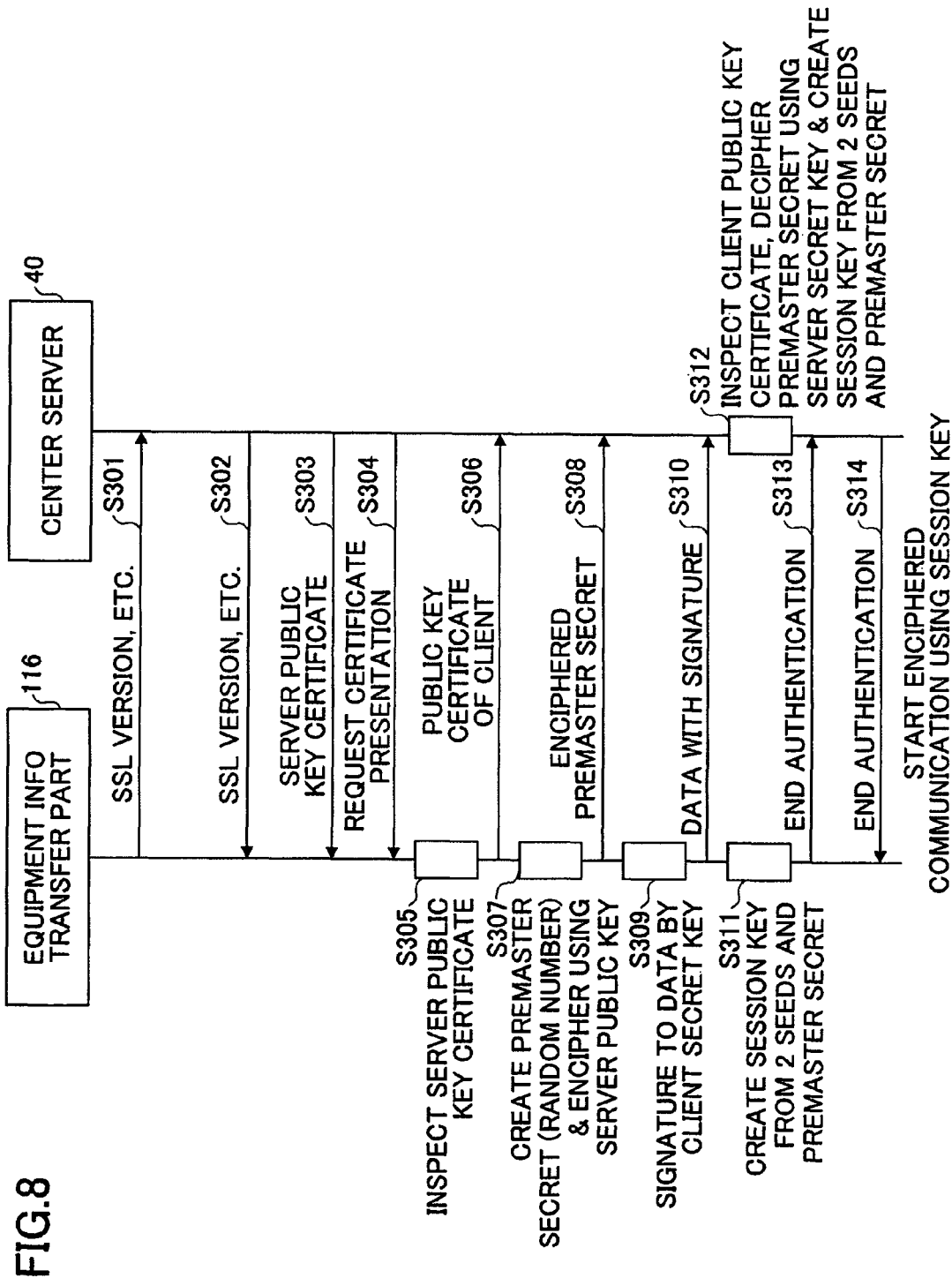
FIG. 8 is a sequence diagram for explaining an authentication process by SSL using the individual certificate package.

FIG. 8 is a sequence diagram for explaining an authentication process by the SSL using the individual certificate package. In this authentication process, it is a precondition that the certificate package is also introduced to the center server 40. In other words, in this embodiment, a unique certificate package is introduced (or stored) in advance in the center server 40. The certificate package introduced in advance to the center server 40 includes a unique public key certificate (or server public key certificate) for each center server 40, a unique secret key (or server secret key) for each center server 40, and a public key certificate of the authenticator 60.

When starting the communication, the equipment information transfer part 116 sends a SSL version number, supported enciphering set, a random number and the like to the center server 40, in a step S301. The center server 40 sends the SSL version number, the enciphering set used, the random number and the like to the equipment information transfer part 116, in a step S302. The center server 40 sends a server public key certificate to the equipment information transfer part 116, in a step S303. The center server 40 requests presentation of the certificate to the equipment information transfer part 116, in a step S304. The center sever 40 thereafter waits for a response from the equipment information transfer part 116.

When the equipment information transfer part 116 receives the server public key certificate, the equipment information transfer part 116 inspects the received server public key certificate using the authenticator public key certificate 1172, in a step S305. When the legitimacy of the server public key certificate is confirmed, the equipment information transfer part 116 sends the client public key certificate 1171 to the center server 40, in a step S306. The equipment information transfer part 116 enciphers a premaster secret (random number) which is calculated from hash values of data exchanged up to that point in time, by a server public key of the server public key certificate, in a step S307. The equipment information transfer part 116 sends the enciphered premaster secret to the center server 40, in a step S308. The equipment information transfer part 116 makes a signature to the random data calculated using the data exchanged up to that point in time, using the client secret key, in a step S309. The equipment information transfer part 116 random data with the signature to the center server 40, in a step S310. The equipment information transfer part 116 creates a session key based on two seeds and the premaster secret, in a step S311.

Next, the center server 40 inspects the received client public key certificate 1171 using the authenticator public key certificate possessed by the center server 40, and the center server 40 also inspects the data with the signature using the client public key certificate 1171, in a step S312. In addition, the center server 40 creates a session key from the two seeds and the premaster secret deciphered (or decrypted) using the server secret key, in the step S312.

The equipment information transfer part 116 sends a message indicating that the data will thereafter be sent using a common key, and a message indicating an end of the SSL authentication to the center server 40, in a step S313. The center server 40 sends a message indicating that the data will thereafter be sent using the common key, and a message indicating an end of the SSL authentication to the equipment to the equipment information transfer part 116, in a step S314. After the step S314, an enciphered communication using the session key is started. By this enciphered communication, the equipment information transfer part 116 sends the equipment information and the like with respect to the center server 40. Hence, if a legitimate individual certificate package 117 is not introduced to the PC 10, the authentication process shown in FIG. 8 will not be successful and the enciphered communication using the session key cannot be performed thereafter. In other words, the equipment information is transferred on the condition that the activation with respect to the equipment information notifying program 11 is successful and the individual certificate package 117 is introduced to the PC 10.

The authentication process shown in FIG. 8 achieves the mutual authentication from the theory that an illegitimate server other than the center server 40 possessing the certificate will not possess the secret key and will not be able to decipher the premaster secret sent from the equipment information transfer part 116, and an illegitimate client other than PC 10 having the equipment information transfer part 116 which possesses the certificate will not be able to confirm the signature from the client.

There are cases where it is desirable to install and operate the equipment information notifying program 11 on a different PC 10 without newly purchasing the license, such as when the PC 10 introduced with the individual certificate package 117 fails or, due to work-related or operation-related reasons. Next, a description will be given of a processing sequence that is executed in such cases.

Figure 9:
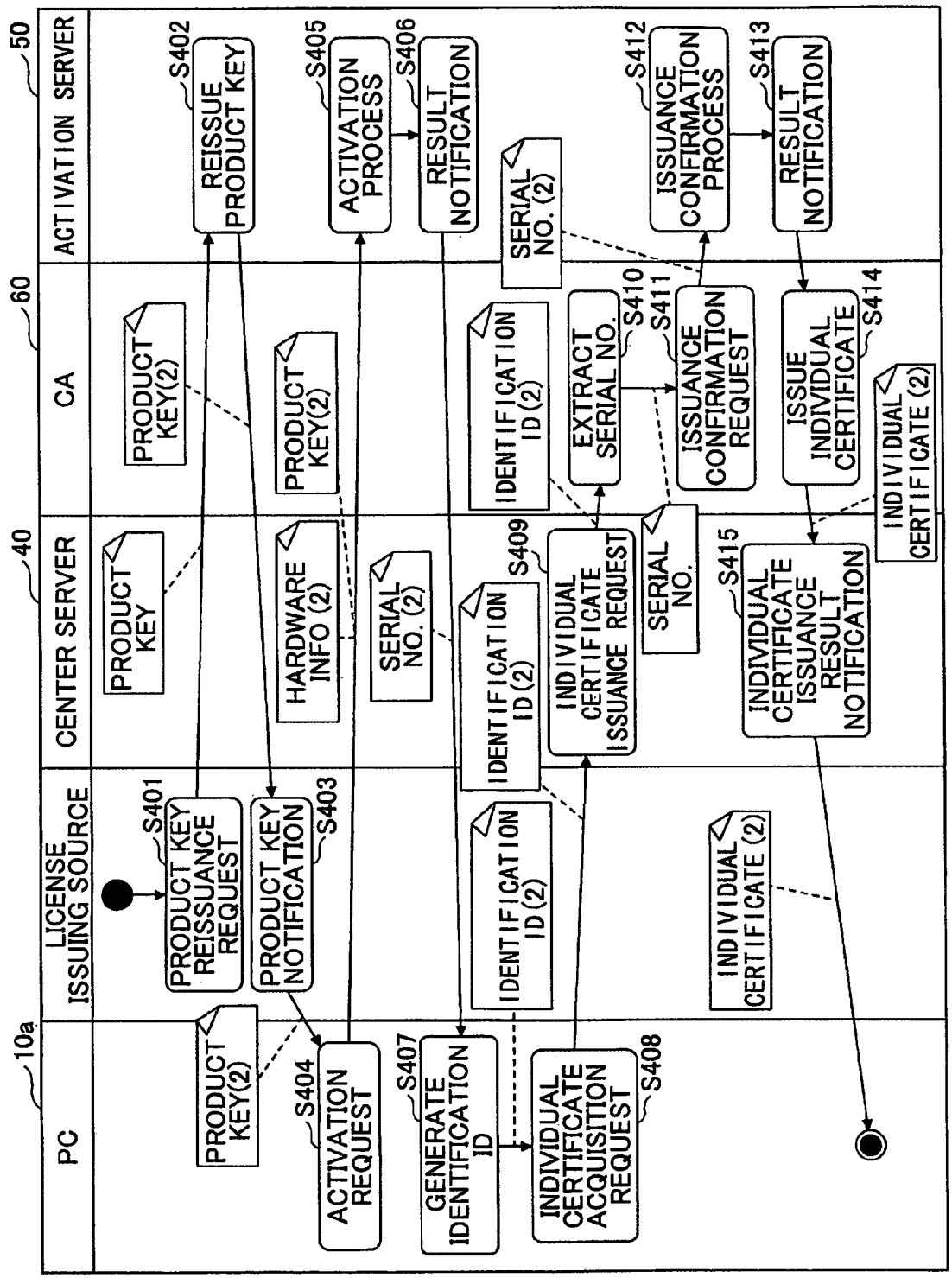
FIG. 9 is a diagram for explaining a first processing procedure for a case where the same license is applied to a different PC.

FIG. 9 is a diagram for explaining a first processing procedure for a case where the same license is applied to a different PC.

In this case, the user at the user site of the equipment 20 requests issuance of a different product key with respect to the already purchased license, that is, requests reissuance of the product key. When making this request, the user notifies the old product key which is already issued with respect to the license to the license issuing source. When the computer at the license issuing source receives the old product key, this computer sends a product key reissue request to the activation server 50 together with the old product key, in a step S401.

The activation server 50 generates a new product key which is to replace the old product key, that is, reissues the product key, and returns the new product key which is generated (or the product key which is reissued) to the computer at the license issuing source, in a step S402. When reissuing the product key, the activation server 50 turns ON the invalid flag corresponding to the old product key in the activation management table 51. By turning ON the invalid flag, the old product key is invalidated. Thereafter, any activation request based on the old product key is rejected.

The license issuing source notifies the product key which is reissued with respect to the user site of the equipment 20 to this user site, in a step S403.

Thereafter, a PC 10a which is newly installed with the equipment information notifying program 11 is utilized, and a processing sequence similar to the processing sequence described above in conjunction with FIG. 4 is executed based on the reissued product key, in steps S404 through S415. Accordingly, a new serial number is issued in the step S405, and a new individual certificate package 117 is issued in the step S414.

If the PC 10 possessing the old product key were to attempt transfer of the equipment information by the equipment information transfer part 116 using the old individual certificate package, the activation server 50 would return a response indicating that the execution of the equipment information transfer is not permitted, based on the invalidated old product key, in response to an inquiry from the equipment information transfer part 116 inquiring whether or not the execution of the equipment information transfer is permitted. For this reason, an equipment information transfer which would violate the license will be prevented.

Figure 10:
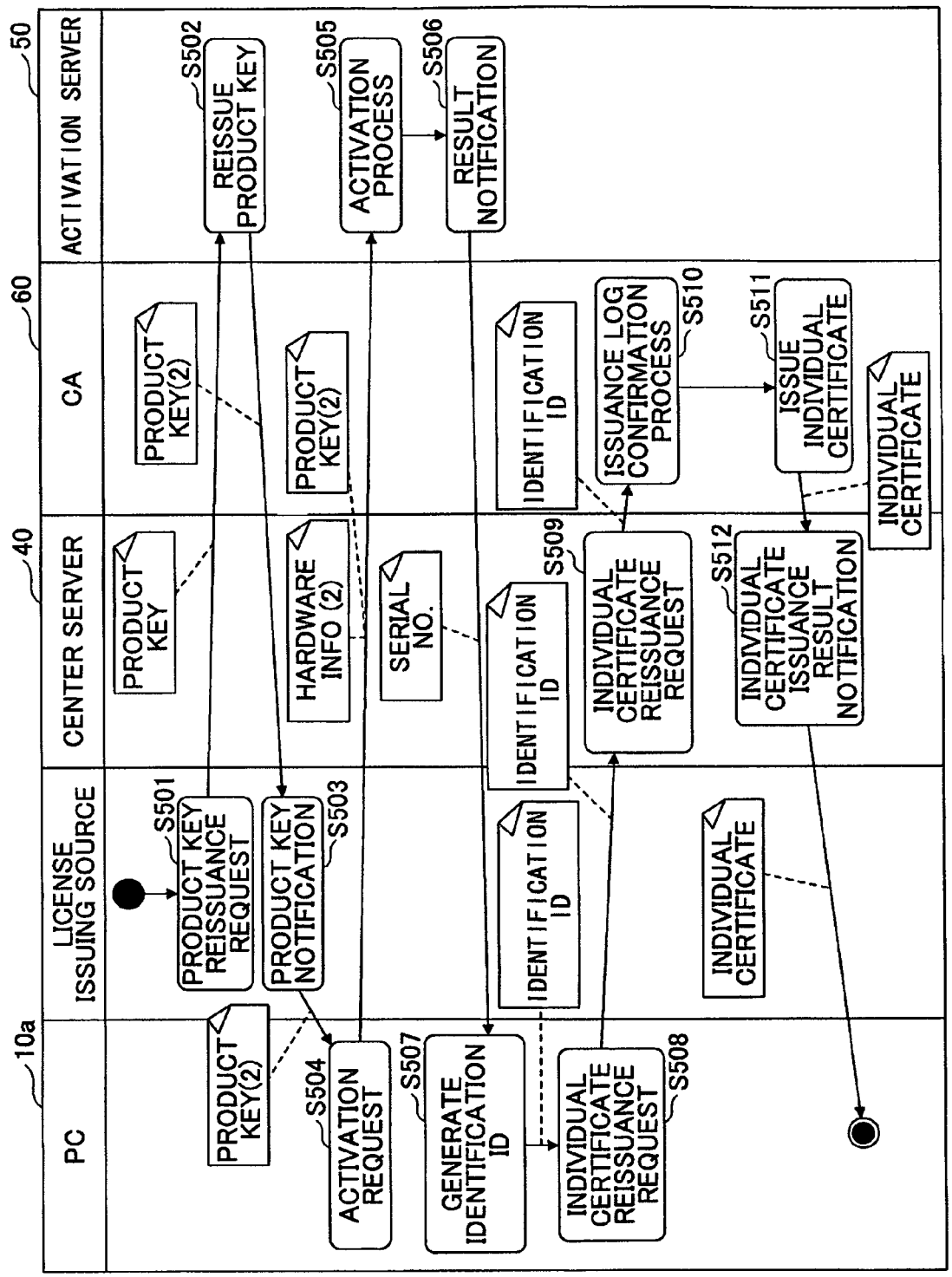
FIG. 10 is a diagram for explaining a second processing procedure for a case where the same license is applied to a different PC.

It is also possible to execute the processing procedure shown in FIG. 10 in place of the processing procedure shown in FIG. 9. FIG. 10 is a diagram for explaining a second processing procedure for the case where the same license is applied to the different PC.

The process of reissuing the product key, performed by steps S501 through S503 shown in FIG. 10, is basically the same as the process performed by the steps S401 through S403 show in FIG. 9. However, in the step S502, the activation server 50 not only invalidates the old product key, but also stores in the storage device thereof information indicating the correspondence between the reissued product key (that is, the new product key) and the old product key.

Next, the activation request part 113 of the PC 10a sends an activation request for (or request to use) the equipment information notifying program 11, together with the new product key and the hardware information of the PC 10a, to the activation server 50, in a step S504. The activation server 50 performs an activation process based on the new product key and the hardware information, in a step S505. In this state, the activation server 50 does not generate a new serial number with respect to the new product key, and makes the serial number registered with respect to the old product key which corresponds to the new product key correspond to the new product key in the activation management table 51, in the step S505. Accordingly, the activation server 50 returns to the PC 10a the serial number which is identical to the serial number with respect to the old product key, in the step S505.

Steps S507 through S509 shown in FIG. 10 are similar to the steps S407 through S409 shown in FIG. 9. However, in the step S507, the individual certificate request part 114 specifically requests reissuance of the individual certificate package 117. Accordingly, the center server 40 sends the individual certificate reissue request to the CA 60, in the step S509. The CA 60 judges whether or not the received identification ID is registered in the certificate issuance log list 61 shown in FIG. 7, in response to the individual certificate reissue request. When the received identification ID is registered in the certificate issuance log list 61, the CA 60 generates the individual certificate package 117 without making an inquiry with respect to the activation server 50, and sends the generated individual certificate package 117 to the center server 40, in a step S511. In FIG. 10, the identification ID for which the individual certificate package 117 has once been issued will be regarded as being legitimate. Hence, the CA 60 does not need to make an inquiry with respect to the activation server 50, and the process of issuing the individual certificate package 117 is simplified. The process performed after the step S511, in the process performed in a step S512, is the same as the process performed in FIG. 9.

As described above, according to the equipment information monitoring system 1 of this first embodiment, it is possible to appropriately issue the individual certificate package 117 by the link between the activation server 50 and the CA 60. In other words, the activation server 50 allocates a unique serial number with respect to the pair of product key and hardware information. On the other hand, the CA 60 inquires the legitimacy of the license based on the serial number, in response to the request to issue the individual certificate package 117, and issues the individual certificate package 117 only when the legitimacy of the license is confirmed. Therefore, it is possible to appropriately issue, with respect to the PC 10, the individual certificate package 117 which is unique to the PC 10. As a result, it becomes possible to identify each of the individual PCs 10, that is, each of the equipment information notifying programs 11.

Next, a description will be given of a second embodiment. In describing this second embodiment, only those parts which differ from the first embodiment will be described.

Figure 11:
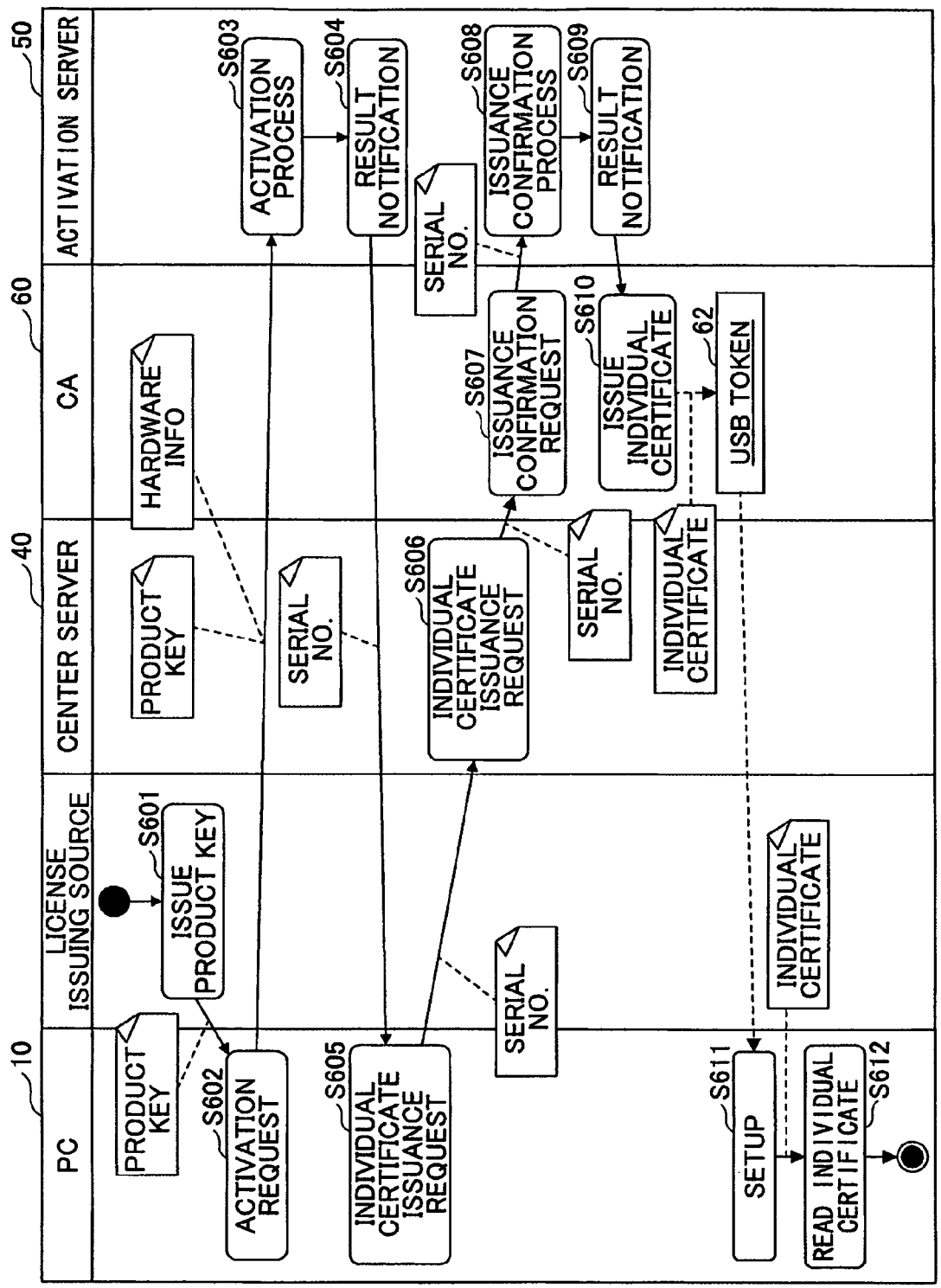
FIG. 11 is a diagram for explaining the individual certificate packet issuing process in a second embodiment.

FIG. 11 is a diagram for explaining the individual certificate packet issuing process in the second embodiment.

Steps S601 through S609 shown in FIG. 11 are similar to the steps S101 through S111 shown in FIG. 4. However, in the step S605, the individual certificate request part 114 of the PC 10 sends the serial number and not the identification ID in response to the request to issue the individual certificate package 117. In other words, the identification ID is not generated, and the serial number is notified to the CA 60 in the step S606. Consequently, the CA 60 does not need to extract the serial number from the identification ID.

Of course, the generation of the identification ID is also not essential in the first embodiment described above. In other words, the first embodiment may also request the issuance of the individual certificate package 117 based on the serial number.

When the activation server 50 confirms that the serial number is a serial number which has already been issued, the CA 60 generates the individual certificate package 117 and records the individual certificate package 117 in a Universal Serial Bus (USB) token 62 which is connected to a USB port (or USB connector) of the CA 60, in a step S610.

Accordingly, the individual certificate package 117 can be distributed to the user site of the equipment 20 using the USB token 62 as the medium.

When a setup of the USB token 62 is made by connecting the USB token 62 to a USB port of the PC 10 in a step S611, the individual certificate request part 114 reads the individual certificate package 117 from the USB token 62 and stores the individual certificate package 117 in the HDD 102, in a step S612. However, it is not essential to store the individual certificate package 117 in the HDD 102, and the individual certificate package 117 may continue to be stored in the USB token 62. In this case, the USB token 62 must be connected to the PC 10 during operation of the equipment monitoring system 1.

According to this second embodiment, it is also possible to securely issue the individual certificate package 117. Of course, the medium used to distribute the individual certificate package 117 is not limited to the USB token 62. For example, any portable recording medium, such as a USB memory and a CD-ROM, may be used as the medium for distributing the individual certificate package 117.

Next, a description will be given of a third embodiment. In this third embodiment, the functions of the CA 60 and the activation server 50 are installed in the portable recording medium (or portable information processing device) which is mounted with an IC chip that includes a CPU, a memory and the like. This third embodiment uses a USB token as an example of the information processing device, but it is of course possible to use other recording media which include a processor and a storage device.

Figure 12:
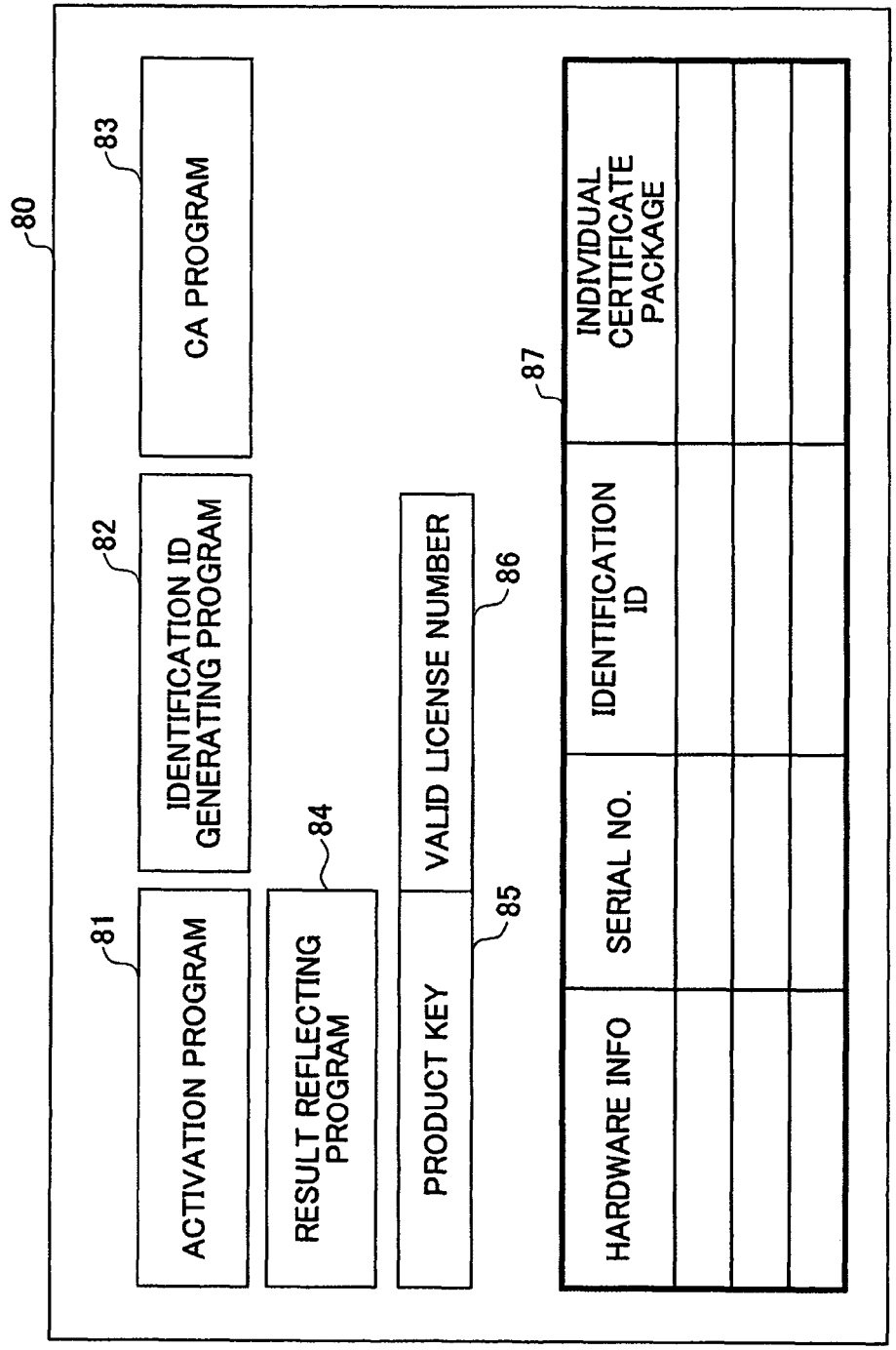
FIG. 12 is a diagram showing an example of a structure within a Universal Serial Bus (USB) token in a third embodiment.

FIG. 12 is a diagram showing an example of a structure within a USB token in the third embodiment. A USB token 80 shown in FIG. 12 is recorded with four programs and data. The four programs include an activation program 81, an identification ID generating program 82, a CA program 83, and a result reflecting program 84. The data include a product key 85, a valid license number 86, and a management table 87.

The activation program 81 realizes the functions of the activation server 50 in a simplified manner. The identification ID generating program 82 generates the identification ID. The CA program 83 realizes the functions of the CA 60 in a simplified manner. The result reflecting program 84 reflects the contents of the processes executed by the activation program 81 and the CA program 83 to the activation server 50 and the CA 60.

The product key 85 is a product key issued from the license issuing source. The valid license number 86 is the number of licenses set with respect to the product key 85. In other words, FIG. 12 shows a state after the product key is issued. In a case where the license number (that is, the number of licenses) is one or a fixed value which is determined in advance, it is not essential to record the valid license number 86 in the USB token 80.

The management table 87 manages the hardware information, the serial number, and the identification ID for each individual certificate package 117 which has been issued. Hence, in an initial state where no individual certificate package 117 has been issued using the USB token 80, the management table 87 is empty.

Figure 13:
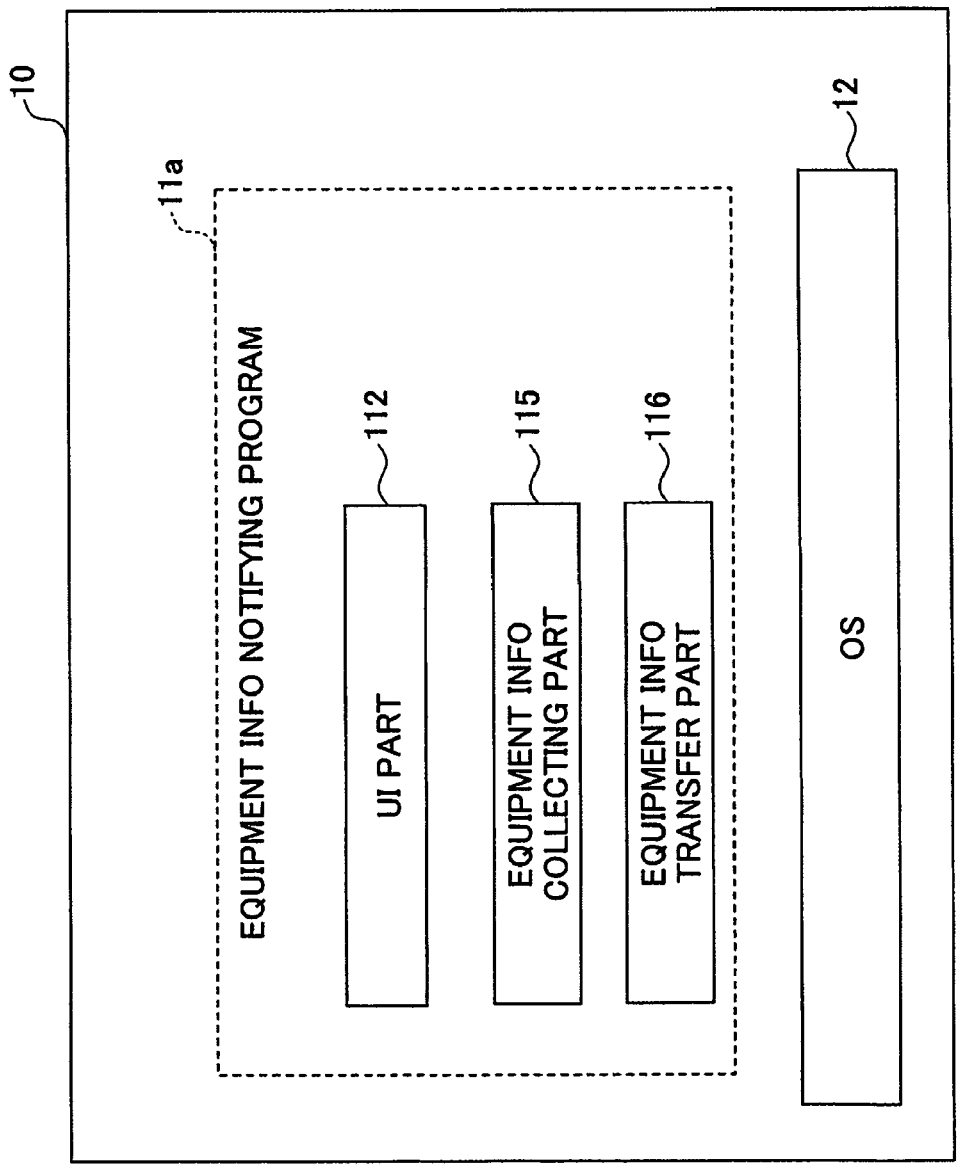
FIG. 13 is a diagram showing an example of a functional structure of the PC in a third embodiment.

FIG. 13 is a diagram showing an example of a functional structure of the PC in the third embodiment. In FIG. 13, those parts that are the same as those corresponding parts in FIG. 3 are designated by the same reference numerals, and a description thereof will be omitted.

As shown in FIG. 13, an equipment information notifying program 11a does not include an activation request part 113 and an individual certificate request part 114. Hence, the structure of the equipment information notifying program 11a is simplified according to this third embodiment.

Figure 14:
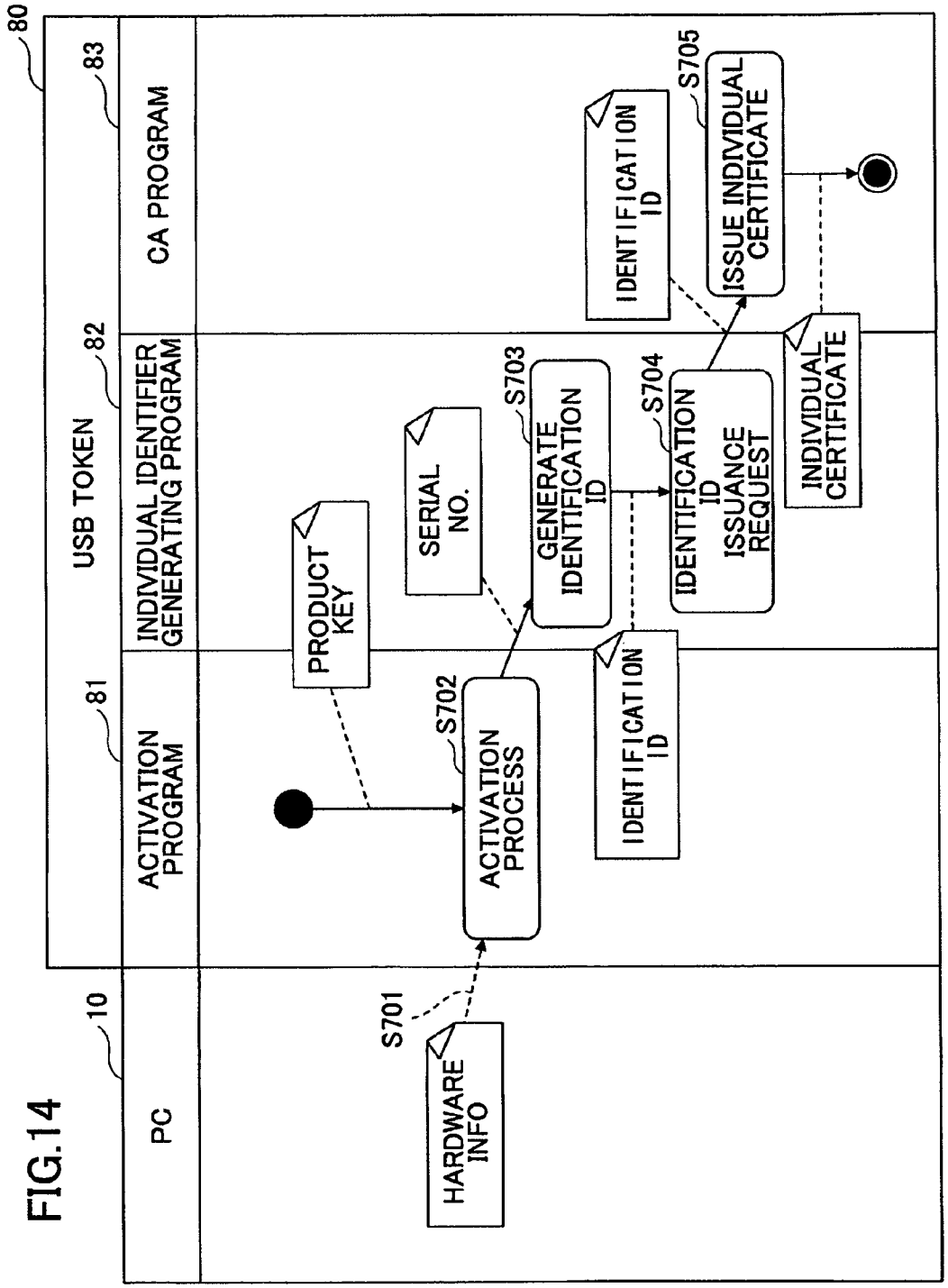
FIG. 14 is a diagram for explaining the individual certificate package issuing process in the third embodiment.

Next, a description will be given of the processing procedure for this third embodiment. FIG. 14 is a diagram for explaining the individual certificate package issuing process in the third embodiment. In FIG. 14, the activation program 81, the identification ID generating program 82 and the CA program 83 causes the IC chip of the USB token 80 to execute the respective processes thereof.

When the USB token 80 is connected to the USB port of the PC 10, the activation program 81 reads the hardware information from the PC 10, in a step S701. The hardware information may be read directly from the PC 10 or, input via the equipment information notifying program 11a. The activation program 81 executes an activation process based on the product key 85 and the hardware information, in a step S702. More particularly, the activation program 81 confirms whether or not the number of records registered in the management table 87 has reached the valid license number 86, and whether or not the hardware information acquired by the PC 10 is already registered in the management table 87. If the number of records has not reached the valid license number 86 and the hardware information is not registered in the management table 87, the activation program 81 generates a unique serial number with respect to the pair of the hardware information and the product key 85. The activation program 81 registers the hardware information and the serial number in the management table 87, and notifies the serial number to the identification ID generating program 82.

The identification ID generating program 82 acquires a model ID from the equipment information notifying program 11a, and generates an identification ID based on the model ID and the serial number, in a step S703. The identification ID generating program 82 registers the generated identification ID in the management table 87 in correspondence with the serial number. The identification ID generating program 82 requests issuance of the individual certificate package 117 with respect to the CA program 83 based on the identification ID, in a step S704.

The CA program 83 generates a unique individual certificate package 117 for each identification ID, and registers the individual certificate package 117 in the management table 87 in correspondence with the identification ID, in a step S705.

Figure 15:
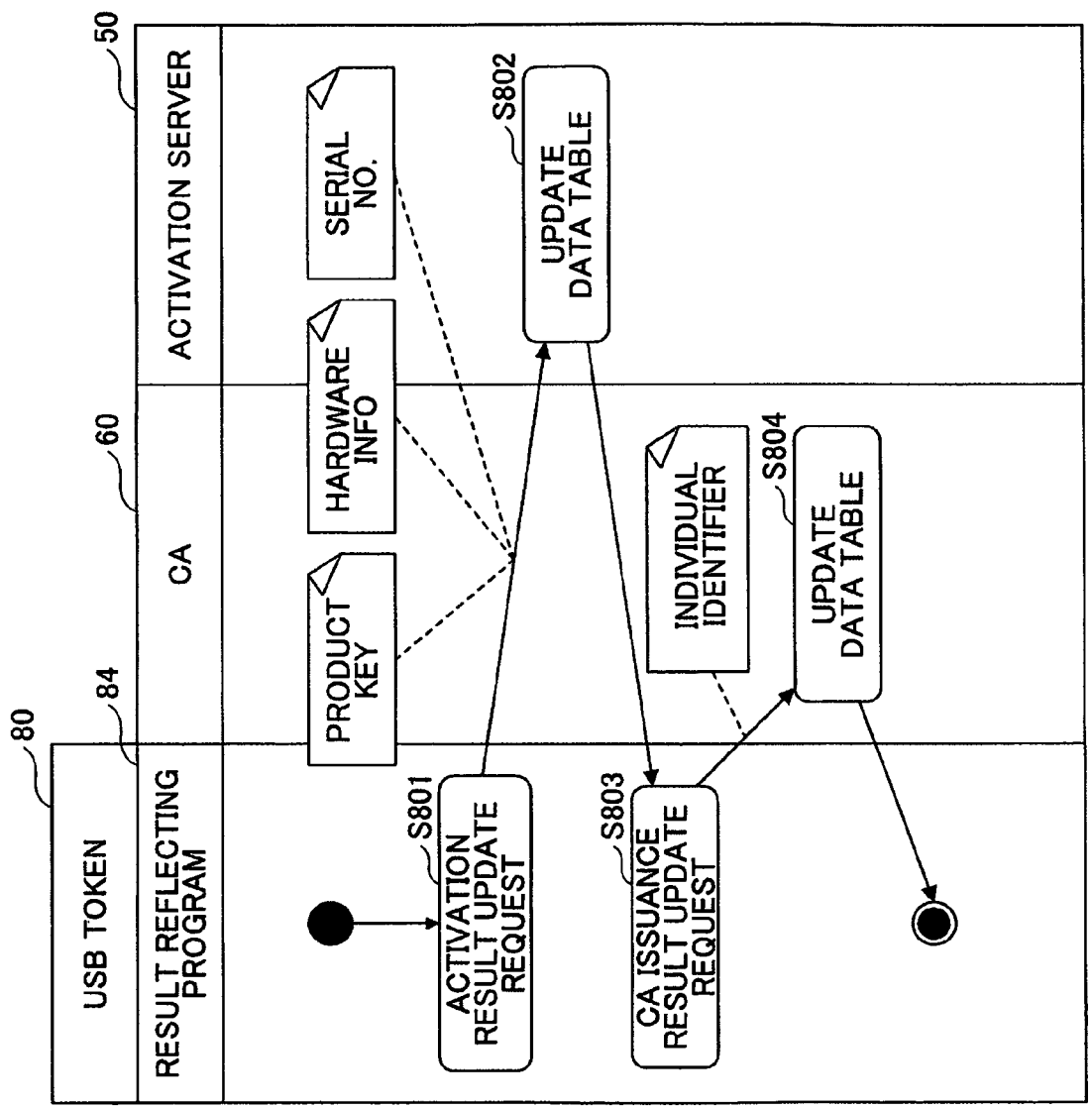
FIG. 15 is a diagram for explaining a processing result reflecting process for a USB token.

The following process is executed in response to the issuance of the individual certificate package 117. FIG. 15 is a diagram for explaining a processing result reflecting process for a USB token.

In FIG. 15, the result reflecting program 84 sends the product key 85, the hardware information newly registered in the management table 87, and the serial number, to the activation server 50 via the PC 10, as the processing result of the simplified activation process, in a step S801.

The activation server 50 registers the received product key 85, hardware information and serial number in the activation management table 51, in correspondence with each other, in a step S802. Hence, the result of the simplified activation process is reflected to the activation server 50.

The result reflecting program 84 sends the identification ID newly registered in the management table 87 to the CA 60 via the PC 10, in a step S803. The CA 60 registers the received identification ID in the certificate issuance log list 61, in a step S804. Hence, the result of the simplified process of issuing the individual certificate package 117 is reflected to the CA 60.

Identification information which enables the communication between the activation server 50 and the CA 60, such as the IP address, the host name and the URL, may be recorded within the USB token 80 or, may be read from an external source by reading the information stored in the equipment information notifying program 11a, for example.

The processes shown in FIGS. 14 and 15 are executed by using the single USB token 80 within the user site of the equipment 20. Accordingly, it is possible to appropriately prevent a license violation, and to introduce the individual certificate package 117 which is unit to each PC 10.

The equipment information transfer part 116 of the PC 10 uses the individual certificate package 117 corresponding to the hardware information of the PC 10 by reading the individual certificate package 117 from the USB token 80 every time the equipment information is transferred. In other words, the individual certificate package 117 is continuously stored in the USB token 80. For this reason, it is necessary to connect the USB token 80 to the PC 10 during operation of the equipment monitoring system 1.

If the individual certificate package 117 can be stored securely within the PC 10, the individual certificate package 117 may be imported from the USB token 80 to the equipment information notifying program 11a, that is, to the storage device of the PC 10. In this case, it is unnecessary to connect the USB token 80 to the PC 10 during operation of the equipment monitoring system 1.

In the case of a volume license having the valid license number 86 which is two or greater for the product key 85, a single USB token 80 may be used with respect to a plurality of PCs 10 as a simplified individual certificate setting tool.

The process shown in FIG. 15 may be executed asynchronously to the process shown in FIG. 14. In other words, after the process shown in FIG. 14 is executed by using the same USB token 80 with respect to a plurality of PCs 10, the USB token 80 may be connected to another PC, so as to execute the process shown in FIG. 15 simultaneously for a plurality of PCs. For example, a maintenance person may execute the process shown in FIG. 14 with respect to a number of PCs 10 amounting to the valid license number 86 at the user site of the equipment 20, and the maintenance person may execute the process shown in FIG. 15 after returning to the office of the maintenance service provider. In this case, the USB token 80 must be distributed in advance to the user site.

According to the third embodiment, the program stored in the USB token 80 can execute in a simplified manner the individual certificate issuing procedure which required the linking between the activation server 50 and the CA 60.

Of course, a USB memory device or other portable recording media, not mounted with an IC chip, may be used in place of the USB token 80. In this case, each program within the recording medium can be loaded to the memory device 103 or the like of the PC 10 to cause the PC 10 to execute the processing sequence of each program.

This application claims the benefit of a Japanese Patent Application No. 2008-107891 filed Apr. 17, 2008, in the Japanese Patent Office, the disclosure of which is hereby incorporated by reference.

Further, the present invention is not limited to these embodiments, but various variations and modifications may be made without departing from the scope of the present invention.

What is claimed is:

1. An information processing device comprising:
   a storage device configured to store a predetermined program which causes a computer, that is connectable to the information processing device, to communicate with the information processing device using a secret key and a public key;
   an acquiring unit configured to acquire a product key of the predetermined program and first identification information of the computer from an activation request received from the computer, said activation request including the product key and the first identification information, said product key being issued when a license of the predetermined program is purchased, said first identification information physically and uniquely identifying the computer;
a recording unit configured to record, in the storage device, when a license authentication with respect to the product key, performed based on the product key and the first identification information in response to the activation request, is successful, a pair of the product key and the first identification information, together with second identification information that is unique to the pair of the product key and the first identification information; and
a certificate generating unit configured to generate, for each second identification information, an individual certificate package including a secret key and a public key that are unique to each second identification information, and to record the individual certificate package in the storage device in correspondence with each second identification information, based on third identification information included in an issuance request for the individual certificate packet received from the computer in response to sending the second identification information to the computer, said third identification information being generated in the computer by performing a reversible conversion with respect to a combination of the second identification information and a common model identifier that identifies the predetermined program.

2. The information processing device as claimed in claim 1, wherein the recording unit judges that the license authentication is successful when the pair of the product key and the first identification information recorded in the storage device does not amount to a number of licenses with respect to the product key.

3. The information processing device as claimed in claim 2, wherein the storage device stores information indicating the number of licenses with respect to the product key.

4. The information processing device as claimed in claim 1, further comprising:
a first sending unit configured to receive the product key of the predetermined program and the first identification information, and to send the second identification information recorded in the storage device and the pair of the product key and the first identification information to another computer when the license authentication is successful, said other computer including a management unit configured to register the pair of the product key and the first identification information together with the second identification information; and
a second sending unit configured to send the second identification information stored in the storage device to said other computer which receives the second identification information and generates an individual certificate package including a unique secret key and public key for each second identification information.

5. An electronic certificate issuing method to be implemented in a processor of an information processing device, said electronic certificate issuing method comprising:
an acquiring procedure executed by the processor to acquire a product key of a predetermined program, and first identification information of a computer to which the information processing device is connectable, from an activation request received from the computer, said activation request including the product key and the first identification information, said predetermined program causing the computer to communicate with the information processing device using a secret key and a public key, said product key being issued when a license of the predetermined program is purchased, said first identification information physically and uniquely identifying the computer;
a recording procedure executed by the processor to record, in the information processing device, when a license authentication with respect to the product key, performed based on the product key and the first identification information in response to the activation request, is successful, a pair of the product key and the first identification information, together with second identification information that is unique to the pair of the product key and the first identification information; and
a certificate generating procedure executed by the processor to generate, for each second identification information, an individual certificate package including a secret key and a public key that are unique to each second identification information, and to record the individual certificate package in the information processing device in correspondence with each second identification information, based on third identification information included in an issuance request for the individual certificate packet received from the computer in response to sending the second identification information to the computer, said third identification information being generated in the computer by performing a reversible conversion with respect to a combination of the second identification information and a common model identifier that identifies the predetermined program.

6. The electronic certificate issuing method as claimed in claim 5, wherein the recording procedure judges that the license authentication is successful when the pair of the product key and the first identification information recorded in the information processing device does not amount to a number of licenses with respect to the product key.

7. The electronic certificate issuing method as claimed in claim 6, wherein the information processing device stores information indicating the number of licenses with respect to the product key.

8. The electronic certificate issuing method as claimed in claim 5, further comprising:
a first sending procedure executed by the processor to receive the product key of the predetermined program and the first identification information, and to send the second identification information recorded in the information processing device and the pair of the product key and the first identification information to another computer when the license authentication is successful, said other computer including a management unit configured to register the pair of the product key and the first identification information together with the second identification information; and
a second sending procedure executed by the processor to send the second identification information stored in the information processing device to said other computer which receives the second identification information and generates an individual certificate package including a unique secret key and public key for each second identification information.

9. A non-transitory computer-readable storage medium which stores a program which, when executed by a computer, causes the computer to perform a process of an information processing device, said process comprising:
an acquiring procedure causing the computer to acquire a product key of a predetermined program, and first identification information of a computer system to which the information processing device is connectable, from an activation request received from the computer system, said activation request including the product key and the first identification information, said predetermined program causing the computer system to communicate with the information processing device using a secret key and a public key, said product key being issued when a license of the predetermined program is purchased, said first identification information physically and uniquely identifying the computer system;

a recording procedure causing the computer to record, in the information processing device, when a license authentication with respect to the product key, performed based on the product key and the first identification information in response to the activation request, is successful, a pair of the product key and the first identification information, together with second identification information that is unique to the pair of the product key and the first identification information; and a certificate generating procedure causing the computer to generate, for each second identification information, an individual certificate package including a secret key and a public key that are unique to each second identification information, and to record the individual certificate package in the information processing device in correspondence with each second identification information, based on third identification information included in an issuance request for the individual certificate packet received from the computer system in response to sending the second identification information to the computer system, said third identification information being generated in the computer system by performing a reversible conversion with respect to a combination of the second identification information and a common model identifier that identifies the predetermined program.

10. The non-transitory computer-readable storage medium as claimed in claim 9, wherein the recording procedure causes the computer to judge that the license authentication is successful when the pair of the product key and the first identification information recorded in the information processing device does not amount to a number of licenses with respect to the product key.

11. The non-transitory computer-readable storage medium as claimed in claim 10, wherein the information processing device stores information indicating the number of licenses with respect to the product key.

12. The non-transitory computer-readable storage medium as claimed in claim 9, wherein the process further comprises:

a first sending procedure causing the computer to receive the product key of the predetermined program and the first identification information, and to send the second identification information recorded in the information processing device and the pair of the product key and the first identification information to another computer system when the license authentication is successful, said other computer system including a management unit configured to register the pair of the product key and the first identification information together with the second identification information; and a second sending procedure causing the computer to send the second identification information stored in the information processing device by the recording procedure to said other computer system which receives the second identification information and generates an individual certificate package including a unique secret key and public key for each second identification information.

* * * * *